No. 743,552. PATENTED NOV. 10, 1903.
M. W. OWENS.
CASTER.
APPLICATION FILED AUG. 31, 1903.

NO MODEL.

Witnesses:
Elmer R. Shipley.
M. S. Belden.

Maria W. Owens
Inventor
by James W. See
Attorney

No. 743,552.

Patented November 10, 1903.

UNITED STATES PATENT OFFICE.

MARIA W. OWENS, OF HAMILTON, OHIO.

CASTER.

SPECIFICATION forming part of Letters Patent No. 743,552, dated November 10, 1903.

Application filed August 31, 1903. Serial No. 171,327. (No model.)

*To all whom it may concern:*

Be it known that I, MARIA W. OWENS, a citizen of the United States, residing at Hamilton, Butler county, Ohio, (post-office address No. 225 North Second street, Hamilton, Ohio,) have invented certain new and useful Improvements in Casters, of which the following is a specification.

This invention, pertaining to improvements in casters for furniture, will be readily understood from the following description, taken in connection with the accompanying drawings, in which—

Figure 1:
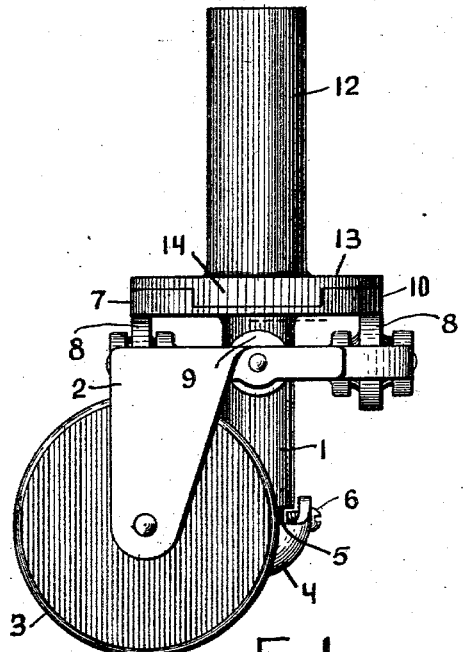
Figure 2:
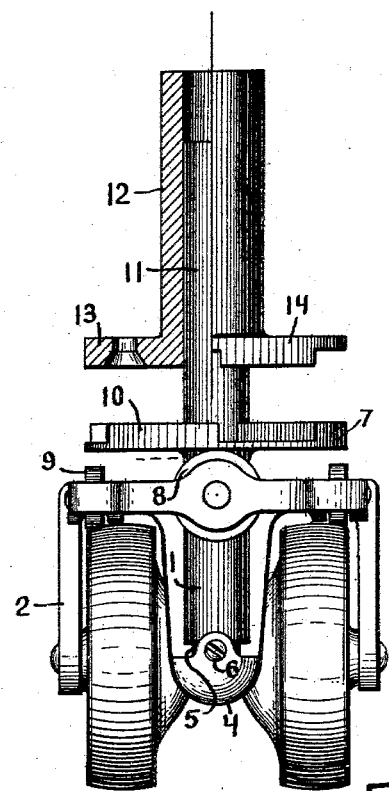
Figure 3:
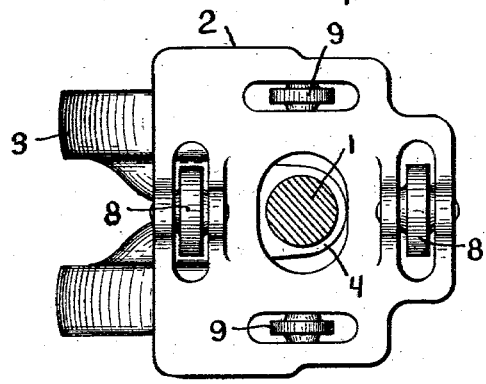
Figure 4:
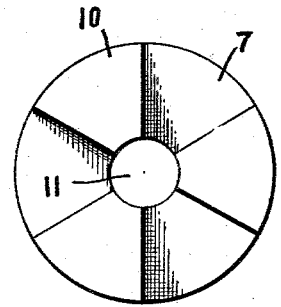

Figure 1 is a side elevation of a caster embodying my improvements; Fig. 2, a front elevation of the same, the socket appearing in partial vertical section; Fig. 3, a plan of the caster with the stem in horizontal section, and Fig. 4 a plan of the stem.

In the drawings, 1 indicates the stem with a hemispherical lower end; 2, the housing; 3, the pair of floor-wheels mounted on an axle carried by the housing; 4, a forwardly-projecting portion of the housing having a hemispherical socket fitting the lower end of the stem; 5, a circumferential groove in the stem near its foot; 6, a retaining-screw through the forward portion of the front wall of the socket and engaging the groove to serve in coupling the housing to the stem; 7, a plate rigid with the stem and disposed over the housing; 8, a pair of wheels with their axes in a common line at right angles to the axis of the floor-wheels, these wheels 8 being mounted in the housing and engaging under plate 7, one to the front and the other to the rear of the stem; 9, a similar pair of wheels mounted in the housing, one at each side of the stem, these wheels, however, being disposed so low as to be entirely free of the plate in the ordinary working of the caster; 10, clutch-lugs projecting upwardly from plate 7; 11, the shank of the stem, the same projecting upwardly from plate 7; 12, the socket, which is adapted to be received in a suitable hole in the furniture, the shank of the stem fitting upwardly and removably in the socket; 13, a flange on the lower end of the socket and having holes for screws, by means of which the socket may be secured to the furniture, and 14 clutch-lugs projecting downwardly from flange 13 and intermembering with clutch-lugs on the plate.

Socket 12 is to be permanently secured to the furniture. The caster is removable downwardly from the socket, and the clutch-lugs on the plate and socket-flange prevent rotation of the stem in the socket and give the stem an extended area of supporting contact with the socket.

In the ordinary forward running of the caster the main load is borne by the rear one of wheels 8, the forward one of those wheels also engaging the plate, the rocking of the housing to suit inequalities of floor taking place against a horizontal axis in the plane of screw 6, the sidewise shifting of wheels 8 upon the plate permitting the rocking motion to take place with comparatively little friction or noise. During the swiveling of the caster in adjusting itself to new directions of motion the foot of the stem furnishes the axis of swiveling, and the two wheels 8 travel around under the plate in contact with it, rendering the motion easy and comparatively silent.

The two wheels 9 are normally quite free from contact with the plate; but when by reason of excessive inequalities in the pathways of the two floor-wheels an extraordinary rocking of the housing takes place then one of these wheels 9 will engage the plate and limit the rocking, even possibly to the point where but one of the floor-wheels rests upon the floor. If at such time, as often occurs, the housing must swivel while thus severely tipped, it may do so with comparative freedom, as it engages the plate through the medium of three wheels. The cramping and "kicking" so often found in two-wheeled casters running on rough floors is thus avoided and at the same time most of the usual rattling noises are avoided.

I claim as my invention—

1. In a caster, the combination, substantially as set forth, of a stem arranged for attachment to furniture, a housing mounted to swivel and rock thereon, a pair of floor-wheels carried by the housing, a plate carried by the stem over the housing, a pair of wheels carried by the housing and engaging the plate at the front and rear of the stem, and a pair of wheels carried by the housing, one at each side of the stem and normally free of the plate.

2. In a caster, the combination, substantially as set forth, of a stem, a housing mounted to swivel and rock thereon, a pair of floor-wheels carried by the housing, a plate upon the stem of the housing, clutch-lugs projecting upwardly from the plate, a shank projecting upwardly from the plate, a socket separably fitting said shank, a flange upon the foot of the socket, and clutch-lugs projecting downwardly from the flange and cooperating with the clutch-lugs on the plate.

MARIA W. OWENS.

Witnesses:
ELMER R. SHIPLEY.
M. S. BELDEN.